(12) United States Patent
Browne et al.

(10) Patent No.: US 6,926,322 B2
(45) Date of Patent: Aug. 9, 2005

(54) LATERALLY EXTENDABLE BUMPER SYSTEM

(75) Inventors: Alan L. Browne, Grosse Pointe, MI (US); Nancy L. Johnson, Northville, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/720,625

(22) Filed: Nov. 24, 2003

(65) Prior Publication Data

US 2005/0110284 A1    May 26, 2005

(51) Int. Cl.⁷ ............................................. B60R 19/40
(52) U.S. Cl. ..................... 293/114; 293/118; 293/149
(58) Field of Search ..................... 293/114, 117, 118, 293/119, 148, 126, 4, 149, 153; 296/187.03, 296/187.06, 187.09, 187.1

(56) References Cited

U.S. PATENT DOCUMENTS

| | | | |
|---|---|---|---|
| 1,504,679 A | 8/1924 | Dietz | |
| 1,593,866 A | 7/1926 | Christinzio | |
| 1,745,705 A * | 2/1930 | Nordquist | 291/47 |
| 2,048,945 A | 7/1936 | Pascheka | 293/55 |
| 2,191,368 A | 2/1940 | Cavanaugh | 293/55 |
| 2,628,118 A | 2/1953 | Gunnels, Jr. | 293/73 |
| 3,677,595 A | 7/1972 | Hamilton | 293/73 |
| 3,741,560 A | 6/1973 | Schaller | 267/134 |
| 3,848,914 A * | 11/1974 | Wathen | 293/9 |
| 3,947,061 A | 3/1976 | Ellis | 293/5 |
| 4,159,833 A * | 7/1979 | Meiners | 280/478.1 |
| 4,234,222 A | 11/1980 | Bays | 293/124 |
| 4,635,983 A * | 1/1987 | Boland et al. | 293/111.1 |
| 4,674,933 A * | 6/1987 | Brown | 414/24.6 |
| 4,746,263 A * | 5/1988 | Cook | 414/543 |
| 5,101,927 A | 4/1992 | Murtuza | 180/275 |
| 5,213,383 A * | 5/1993 | Muselli et al. | 293/2 |
| 5,339,933 A | 8/1994 | Bauer et al. | 188/371 |
| 5,370,429 A | 12/1994 | Reuber et al. | 293/119 |
| 5,951,073 A | 9/1999 | Hall | 293/119 |
| 5,967,573 A | 10/1999 | Wang | 293/119 |
| 6,217,090 B1 | 4/2001 | Berzinji | 293/132 |
| 6,224,120 B1 | 5/2001 | Eipper et al. | 293/118 |
| 6,302,458 B1 | 10/2001 | Wang et al. | 283/132 |
| 6,401,565 B1 | 6/2002 | Wang et al. | 74/502.4 |
| 6,536,818 B1 | 3/2003 | Moss | 293/134 |
| 6,575,509 B1 | 6/2003 | Golden | 293/119 |
| 2001/0024043 A1 | 9/2001 | Breed | 293/119 |

* cited by examiner

*Primary Examiner*—Patricia L. Engle
(74) *Attorney, Agent, or Firm*—Kathryn A. Marra

(57) ABSTRACT

An extendable bumper system for a vehicle, the extendable bumper system comprising: a bumper structure; a laterally extending bumper segment slideably located within the bumper structure; and an actuator in operable communication between the bumper structure and the laterally extending bumper segment. An extendable bumper system for a modular vehicle, the extendable bumper system comprising: a bumper structure located on a moveable platform; a laterally extending bumper segment slideably located within the bumper structure; and a lateral bumper rail located on a body pod and configured to receive the laterally extending bumper segment.

18 Claims, 6 Drawing Sheets

LATERALLY EXTENDABLE BUMPER SYSTEM

TECHNICAL FIELD

The present invention relates to bumper systems for vehicles and, more particularly, to extendable bumper systems for motor vehicles.

BACKGROUND OF THE INVENTION

Motor vehicles typically have a bumper structure supported on a body of the motor vehicle by energy absorbers that convert into work a portion of the kinetic energy of a force on the bumper structure. Such bumper energy absorbers may include relatively movable structural elements attached to the body and the bumper structure and a resistance medium between the structural elements.

Extendable bumper systems may include an actuator forming part of the bumper energy absorber for extending and retracting the bumper structure. Typically, these systems support the bumper structure close to the body of the motor vehicle during certain conditions, such as when the vehicle is being parked, and extend the bumper structure from the body during other conditions to increase the ability of the bumper energy absorbers to convert the kinetic energy of a force on the bumper structure into work.

SUMMARY OF THE INVENTION

The disclosed apparatus relates to an extendable bumper system for a vehicle, the extendable bumper system comprising: a bumper structure; a laterally extending bumper segment slideably located within the bumper structure; and an actuator in operable communication between the bumper structure and the laterally extending bumper segment.

The disclosed apparatus also relates to an extendable bumper system for a modular vehicle, the extendable bumper system comprising: a bumper structure located on a moveable platform; a laterally extending bumper segment slideably located within the bumper structure; and a lateral bumper rail located on a body pod and configured to receive the laterally extending bumper segment.

BRIEF DESCRIPTION OF THE DRAWINGS

Referring to the exemplary drawings wherein like elements are numbered alike in the several Figures.

DETAILED DESCRIPTION

Figure 1:
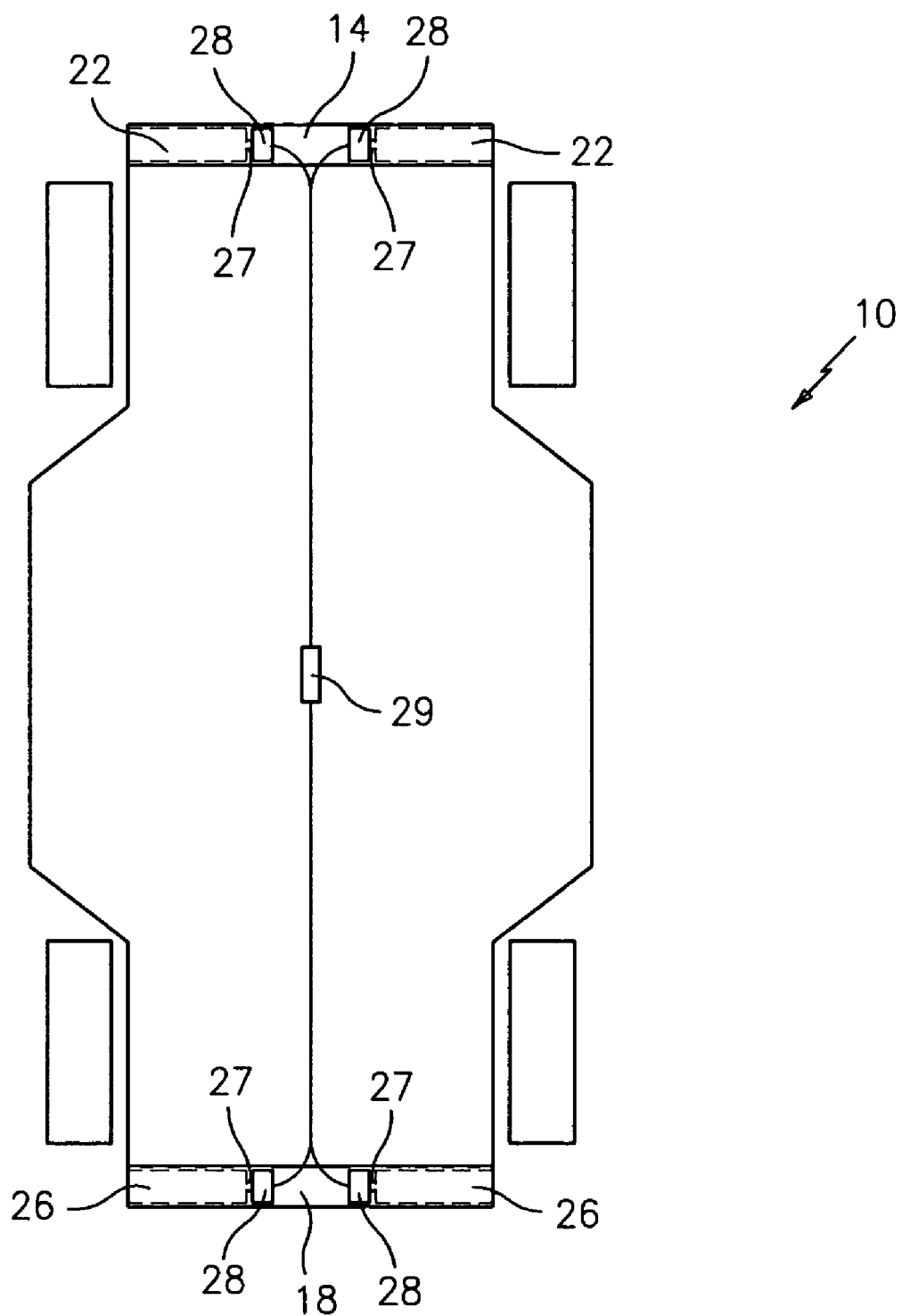
FIG. 1 is a schematic view of a vehicle with two laterally extendable bumper systems in a retracted position.

Referring to FIG. 1, a schematic of a portion of a motor vehicle 10 with a front extendable bumper 14 and a rear extendable bumper 18 is shown. The front extendable bumper 14 is shown with laterally extending bumper segments 22 in a retracted state within the bumper 14. Similarly, the rear extendable bumper 18 is shown with laterally extending bumper segments 26 in a retracted state within the bumper 18. In this embodiment, there may be at least one actuator 28 configured to extend the laterally extending bumper segments 22, 26 into the extended position configuration shown in FIG. 2 via an actuator rod 27. In an embodiment, the actuator 28 may be a motor actuator, hydraulic actuator, or pyrotechnic actuator, or a combination thereof. For example, a pyrotechnic actuator may be used in situations for rapid irreversible expansion when an event, such as an impact, is imminent, and a motor or hydraulic actuator in those situations where the actuator is speed activated. The actuator 28 may be configured to extend the laterally extending bumper segments 22, 26 into the position shown in FIG. 2. The actuator 28 may be in operable communication with a sensor 29. Although in FIGS. 1–4, the sensor 29 is shown in the center of the vehicle, the sensor may be located anywhere on the vehicle, including the perimeter of the vehicle. The sensor may be configured to determine when an impact is about to occur, in which case the sensor 29 may trigger the actuator 28 to actuate and extend the laterally extending bumper segments 22, 26. In another embodiment, the sensor 29 may be configured to detect the speed of the motor vehicle 10, and trigger the actuator 28 to actuate at a certain speed threshold, and to de-actuate when the vehicle returns to a speed below the speed threshold. A locking mechanism may also be incorporated into the front and rear extendable bumpers 14, 18 which would lock the laterally extending bumper segments 22, 26 into the extended position during an impact, or the locking mechanism may be configured to provide energy absorption during an impact. Actuators, sensors, and locking mechanisms may be used for longitudinally extending bumpers. One example of a locking mechanism is a ratchet mechanism.

Figure 2:
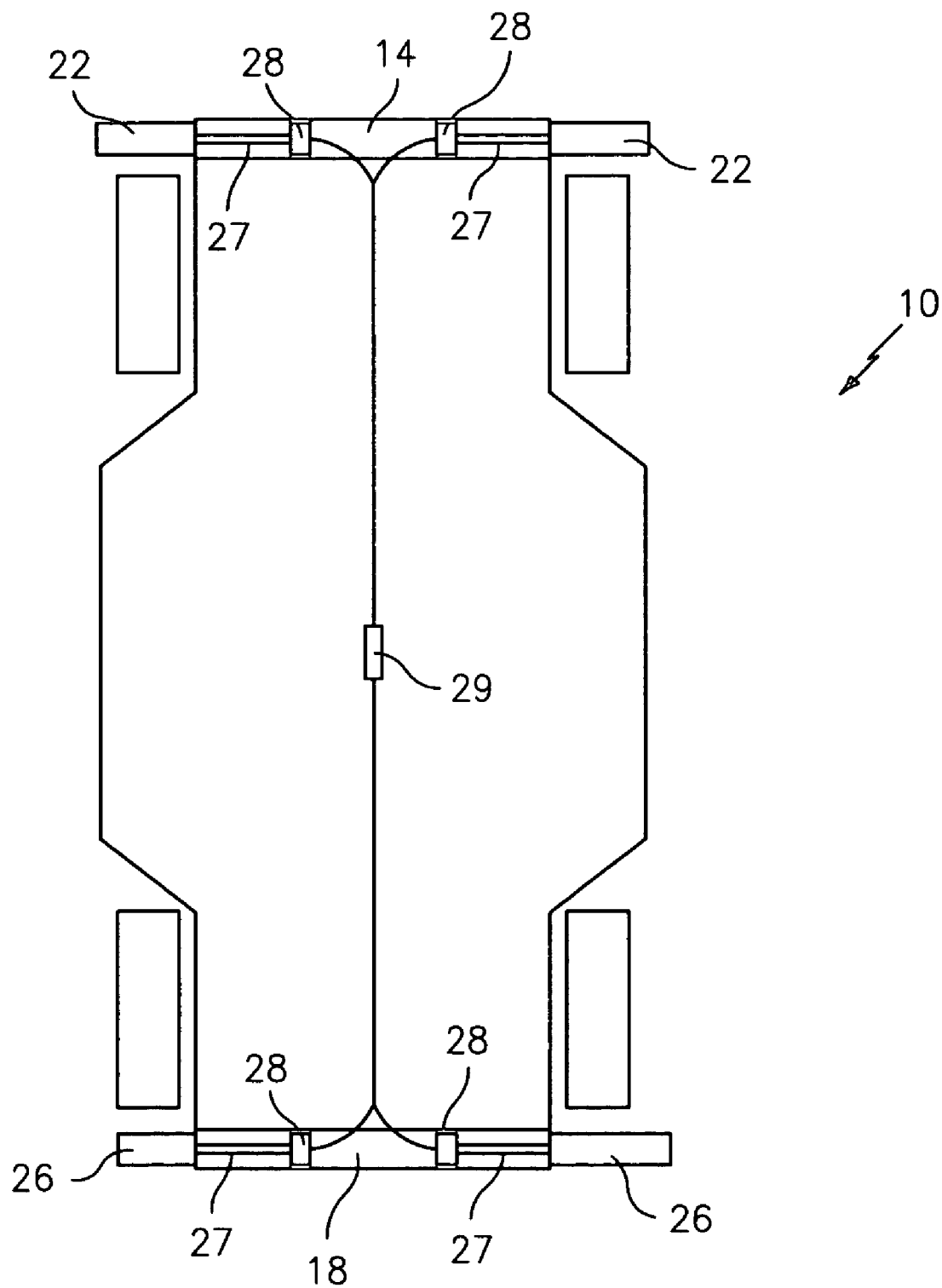
FIG. 2 is a schematic view of the vehicle from FIG. 1, with the two laterally extendable bumper systems in an extended position.

Referring now to FIG. 2, the front extendable bumper 14 is shown with laterally extending bumper segments 22 in an extended configuration. Similarly the rear extendable bumper 18 is shown with laterally extending bumper segments 26 in an extended configuration.

Figure 3:
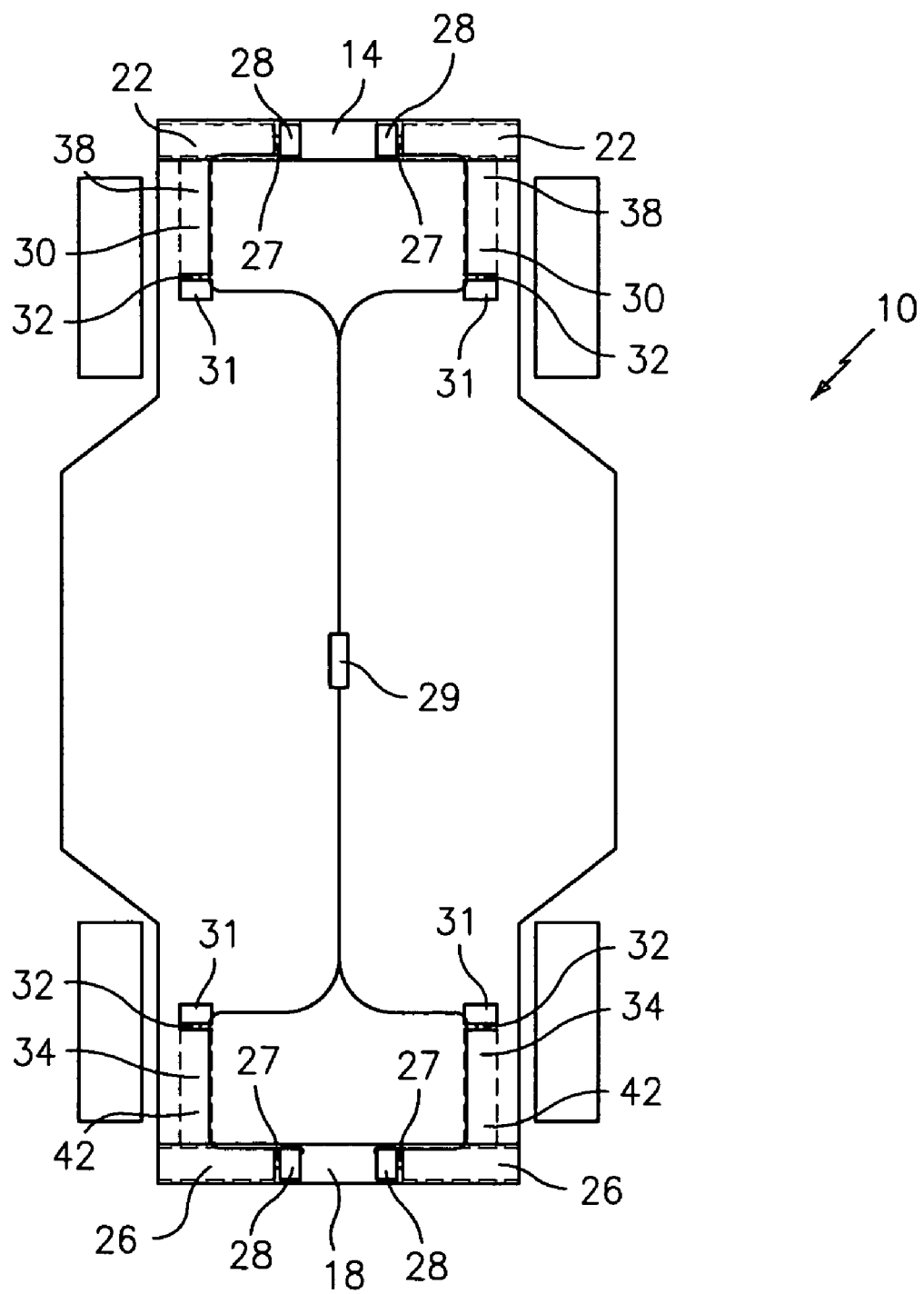
FIG. 3 is a schematic view of a vehicle with two laterally and longitudinally extendable bumper systems in a retracted position.
Figure 4:
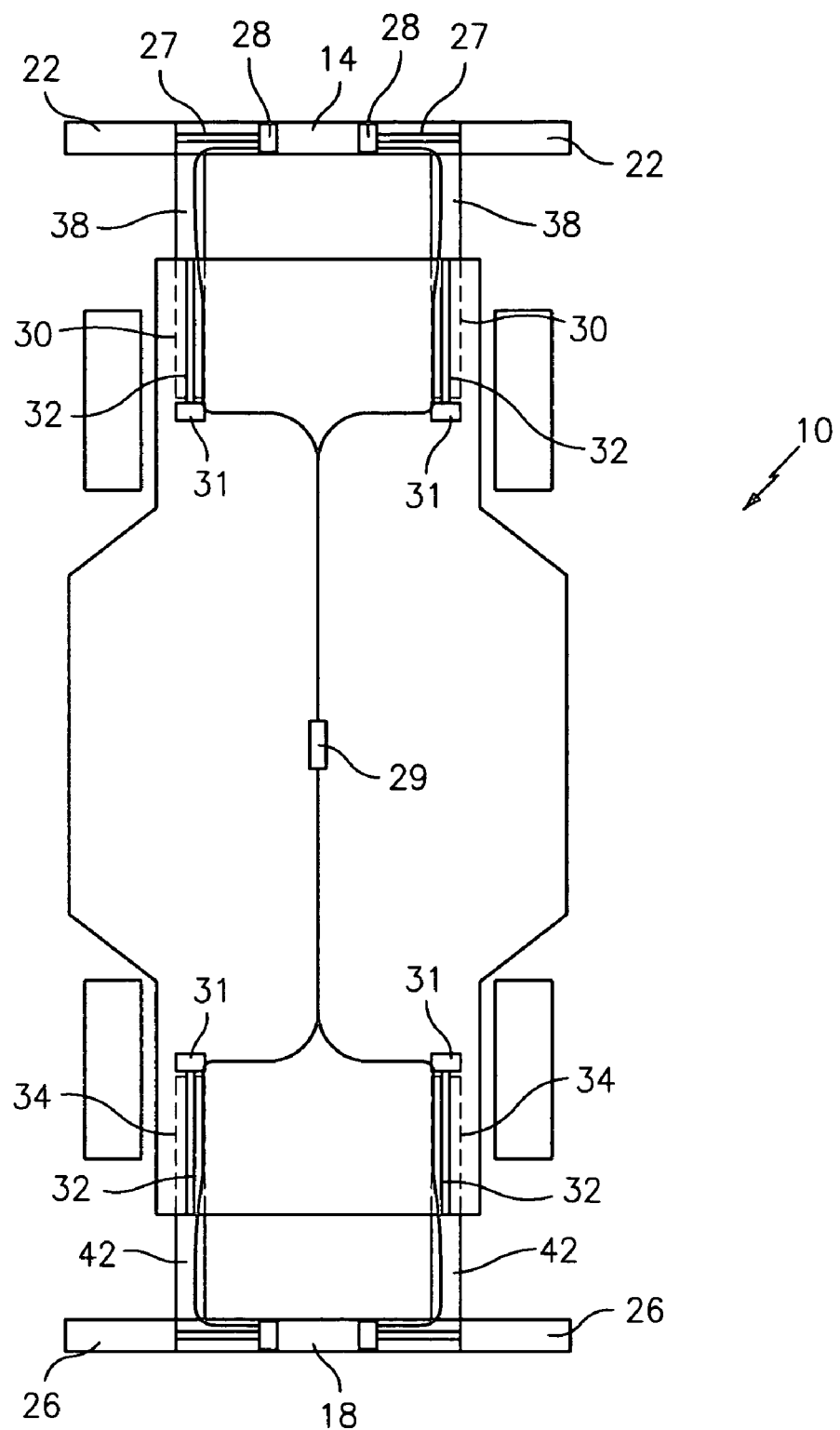
FIG. 4 is a schematic view of the vehicle from FIG. 3, with the two laterally and longitudinally extendable bumper systems in an extended position.

Another embodiment of the disclosed apparatus is shown in FIGS. 3 and 4. Referring to FIG. 3, a schematic of a portion of a motor vehicle 10 with a front extendable bumper 14 and a rear extendable bumper 18 is shown. Like the embodiment shown in FIG. 1, the front bumper 14 and rear bumper 18 are shown with their laterally extending bumper segments 22, 26 in a retracted state. However, in addition, the front and rear bumpers 14, 18 are able to extend longitudinally via the longitudinal bumper rails 30, 34 located on the motor vehicle 10 wherein longitudinally extending bumper segments 38, 42 are located in a retracted state. In this embodiment, there may be at least one longitudinal actuator 31 configured to extend the longitudinally extending bumper segments 38, 42 into the extended position configuration shown in FIG. 4 via a longitudinal actuator rod 32. The longitudinal actuator 31 may be motor actuator, hydraulic actuator, or pyrotechnic actuator, any of which may be configured to extend the longitudinally extending bumper segments 38, 42 into the position shown in FIG. 4. The longitudinal actuator 31 may be in operable communication with a sensor 29. The sensor may be configured to determine when an impact is about to occur, in which case the sensor 29 may trigger the actuators 28, 31 to actuate and extend one or more of the extending bumper segments 22, 26, 38, 42. In another embodiment, the sensor 29 may be configured to detect the speed of the motor vehicle 10, and trigger the actuators 28, 31 to actuate at a certain speed threshold, and to de-actuate when the vehicle returns to a speed below the speed threshold. One or more locking mechanisms may also be incorporated into the front and rear extendable bumpers 14, 18 which would lock both the laterally and longitudinally extending bumper segments 22, 26, 38, 42 into the extended position during an event, such as an impact, or the locking mechanisms may be configured to provide energy absorption during an impact on the extendable bumpers 14, 18. Now, referring to FIG. 4, the front extendable bumper is shown with not only the laterally extending bumper segments 22 in an extended configuration, but with also the longitudinally extending bumper segments 38 in an extended configuration. Likewise, the rear extendable bumper 18 is shown with laterally extending bumper segments 26 in an extended configuration and the longitudinally extending bumper segments 42 in an extended configuration.

Figure 5:
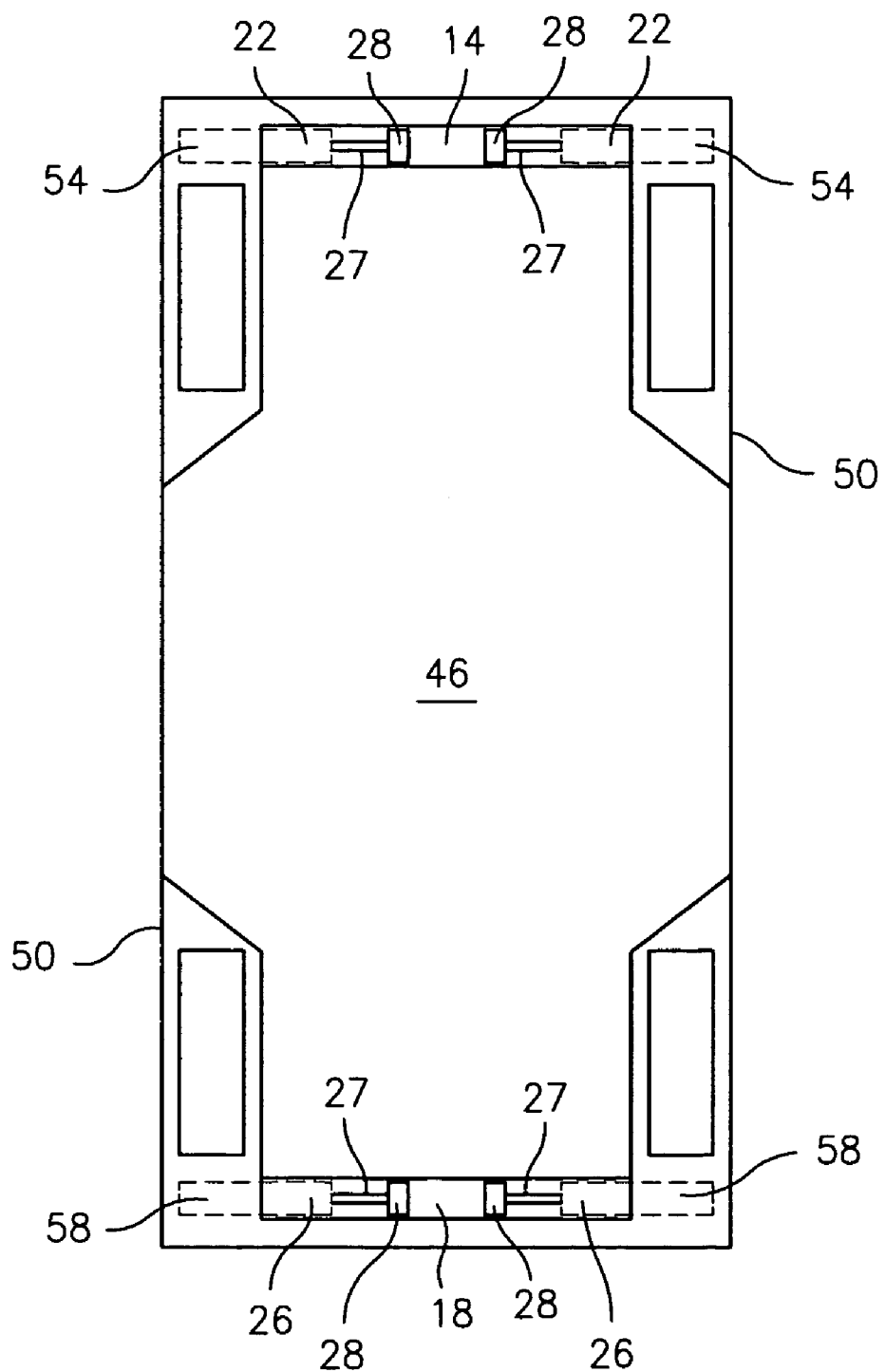
FIG. 5 is a schematic view of a modular vehicle with two laterally extendable bumper systems in a retracted position.
Figure 6:
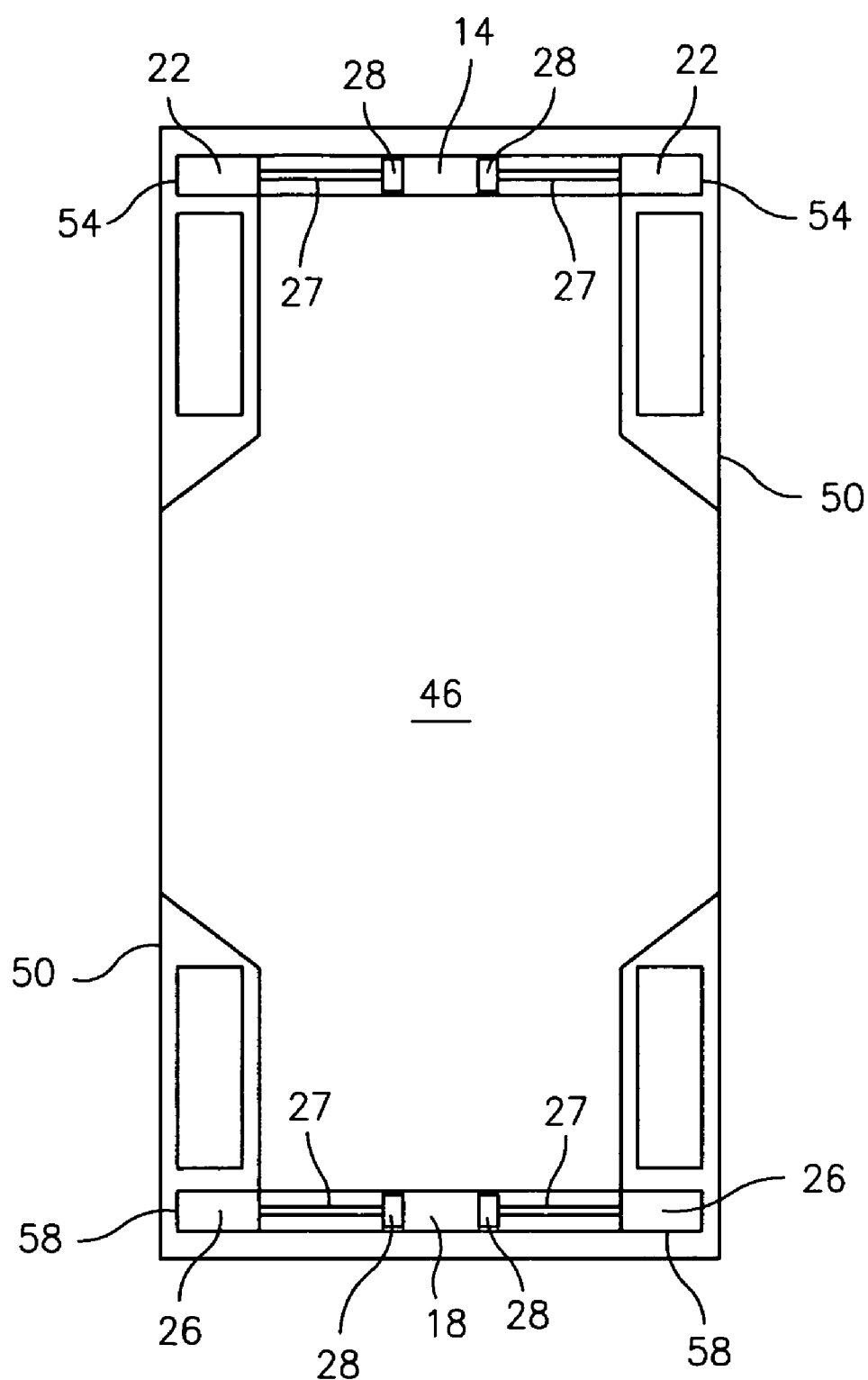
FIG. 6 is a schematic view of a modular vehicle with two laterally extendable bumper systems in an extended position.

The extendable bumper systems may also be useful for use in modular motor vehicles. Some modular vehicles may comprise a moveable platform, such a platform may be moveable via rolling, sliding, tracklaying, or hovering, and body pod, where the moveable platform has substantially all of the mechanical, electrical and structural componentry necessary for a fully functional vehicle, including at least an energy conversion system, a suspension and wheels, a steering system, and a braking system, for example. The moveable platform may have a simplified interface with connection components to which body pods of substantially varying design may be attached. Body pods for these modular vehicles are adapted to conform to the attachment interface of the moveable platform. The body pods may use the connection by wire ("X-by-wire") technology to couple the body pod to the moveable platform and thus eliminate the necessity for mechanical control linkages. X-by-wire technology refers to electronic systems in vehicles which do not rely on conventional physical backups. The extendable bumpers may be used in such a modular motor vehicle to couple or assist in coupling a body pod to a moveable platform. Referring to FIG. 5, a moveable platform 46 is shown. The moveable platform has a front extendable bumper 14 and a rear extendable bumper 18. The front bumper 14 is shown with laterally extending bumper segments 22 in a retracted state within the bumper 14. Similarly, the rear bumper 18 is shown with laterally extending bumper segments 26 in a retracted state within the bumper 18. Shown placed on the moveable platform is a body pod 50, which has not yet been coupled to the moveable platform 46. The body pod has a pair of front lateral bumper rails 54 and a pair of rear lateral bumper rails 58. Referring now to FIG. 6, the laterally extending bumper segments 22 are shown in an extended state and within the front lateral bumper rails 54 of the body pod. Similarly the laterally extending bumper segments 26 are shown in an extended state and within the rear lateral bumper rails 58 of the body pod. Thus, using the extendable bumpers 14, 18 in a modular motor vehicle allows one to couple the body pod 50 to the moveable platform 46 when the laterally extending bumper segments 22, 26 are extended into the lateral bumper rails 54, 58, and in so doing to also form a continuous bumper across the front of the vehicle. Actuators 28 are shown in FIGS. 5 and 6, however, the extendable bumpers may be configured for manual extension of the bumper segments 22, 26, likewise also forming a continuous bumper across the rear of the vehicle. The extending bumper segments 22, 26 may also be withdrawn to uncouple the body pod 50 from the moveable platform.

The extendable bumper system described herein employs laterally extendable bumpers. These bumper systems may provide energy absorption for side and near side impacts. These bumper systems may also provide a means for coupling a body pod to a moveable platform in modular vehicles.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An extendable bumper system for a vehicle, the extendable bumper system comprising:

a bumper structure;

a laterally extending bumper segment slideably located within the bumper structure; and an actuator in operable communication between the bumper structure and the laterally extending bumper segment;

wherein the actuator is responsive to an impending impact at the vehicle such as to cause the laterally extending bumper segment to slideably extend, thereby affording vehicle protection in response to a side or near side impact.

2. The extendable bumper system of claim 1, wherein the actuator is a motor actuator.

3. The extendable bumper system of claim 1, wherein the actuator is a hydraulic actuator.

4. The extendable bumper system of claim 1, wherein the actuator is a pyrotechnic actuator.

5. The extendable bumper system of claim 1, wherein the actuator is a combination of a motor actuator, a hydraulic actuator, and a pyrotechnic actuator.

6. The extendable bumper system of claim 1 further comprising:

a sensor in operable communication with the actuator and configured to determine the vehicle's status and to trigger actuation of the actuator based on the vehicle's status.

7. The extendable bumper system of claim 1 further comprising:

a locking mechanism configured to lock the laterally extending bumper segment.

8. The extendable bumper system of claim 3, wherein the locking mechanism is further configured to lock the laterally extending bumper segment in an extended position prior to and during an event.

9. The extendable bumper system of claim 3, wherein the locking mechanism is further configured to lock the laterally extending bumper segment when vehicle speed exceeds a threshold.

10. The extendable bumper system of claim 1 further comprising:
- at least one longitudinal bumper rail located on the vehicle;
- at least one longitudinally extending bumper segment in slideably operable communication with said longitudinal bumper rail and in operable communication with the bumper structure; and
- an actuator in operable communication with the vehicle and in operable communication with the longitudinally extending bumper segment and configured to longitudinally extend the bumper structure.

11. An extendable bumper system for a modular vehicle, the extendable bumper system comprising:
- a bumper structure located on a moveable platform;
- a laterally extending bumper segment slideably located within the bumper structure;
- a lateral bumper rail located on a body pod and configured to receive the laterally extending bumper segment; and
- an actuator configured to extend the bumper segment into the lateral bumper rail;
- wherein the actuator is responsive to an impending impact at the vehicle such as to cause the laterally extending bumper segment to slideably extend, thereby affording vehicle protection in response to a side or near side impact.

12. The extendable bumper system of claim 11, further comprising:
- a mechanism for manually extending the bumper segment into the lateral bumper rail.

13. The extendable bumper system of claim 11, further comprising:
- a sensor in operable communication with the actuator and configured to determine the vehicle's status and to trigger actuation of the actuator based on the vehicle's status.

14. The extendable bumper system of claim 11, wherein the actuator is a motor actuator.

15. The extendable bumper system of claim 11, wherein the actuator is a hydraulic actuator.

16. The extendable bumper system of claim 11, wherein the actuator is a pyrotechnic actuator.

17. The extendable bumper system of claim 11, wherein the actuator is a combination of a motor actuator, a hydraulic actuator, and a pyrotechnic actuator.

18. An extendable bumper system for a vehicle having a bumper structure, the extendable bumper system comprising:
- a laterally extendable bumper segment in slideably operable communication with the bumper structure;
- a longitudinally extendable bumper segment in slideably operable communication with the bumper structure;
- a lateral actuator in operable communication with the laterally extendable bumper segment and configured to laterally extend the laterally extendable bumper segment;
- a longitudinal actuator in operable communication with the longitudinally extendable bumper segment and configured to longitudinally extend the longitudinally extendable bumper segment; and
- a sensor responsive to an impending impact condition at the vehicle, the sensor in operable communication with the lateral actuator and the longitudinal actuator such that the laterally extendable bumper segment and the longitudinally extendable bumper segment extend in response to a sensed impending impact condition at the vehicle, thereby affording vehicle protection in response to a side or near side impact.

* * * * *